March 31, 1953  W. J. TULL  2,633,567
NAVIGATION SYSTEM
Filed Nov. 27, 1945  2 SHEETS—SHEET 1
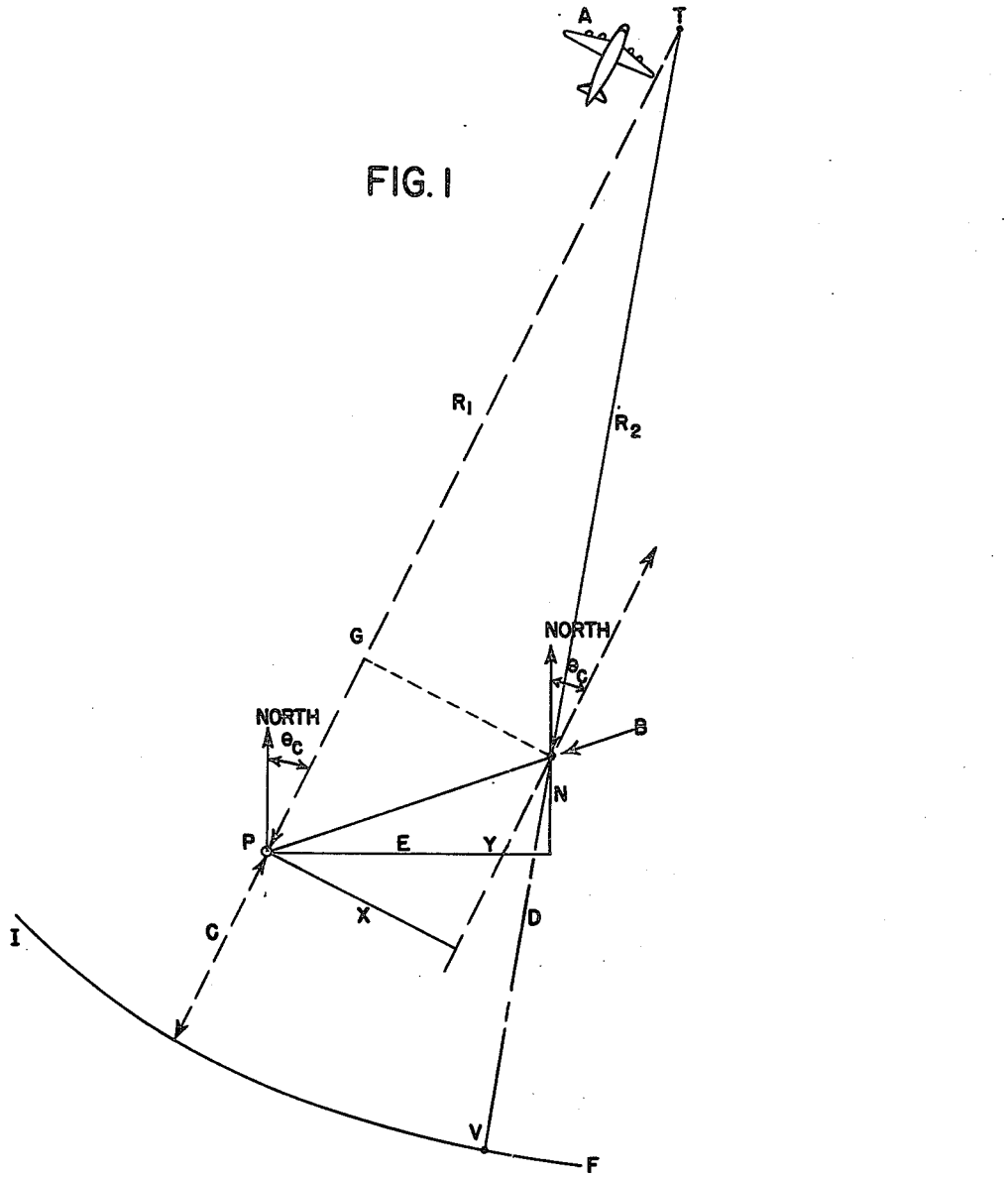
INVENTOR.
WILLIAM J. TULL
BY
ATTORNEY

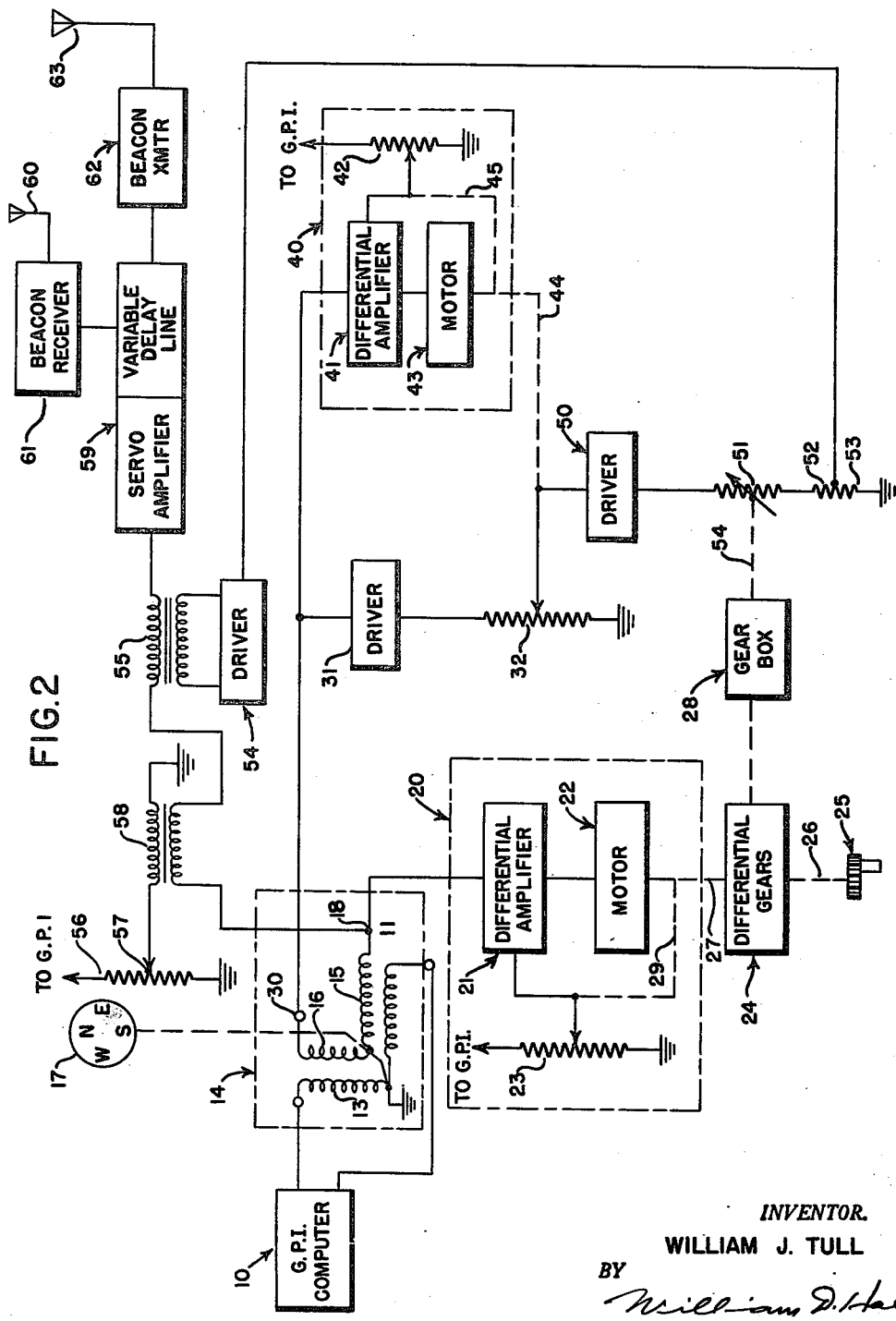

Patented Mar. 31, 1953

2,633,567

UNITED STATES PATENT OFFICE 2,633,567

NAVIGATION SYSTEM

William J. Tull, Cambridge, Mass., assignor, by mesne assignments, to the United States of America as represented by the Secretary of War Application November 27, 1945, Serial No. 631,174

4 Claims. (Cl. 343—6)

This invention relates generally to an electrical apparatus and more particularly to a system for increasing the range of a blind beacon navigation system.

The navigation of an aircraft by dead reckoning means to a predetermined point often becomes difficult due to unpredictable winds, overcast skies, and obstructions of the land formations below.

A system of blind navigation, particularly in regard to directing an aircraft over a particular position for bombing, is disclosed in the copending patent application by Britton Chance, Serial No. 617,873, entitled "Electrical Apparatus," filed 21 September 1945, now patent number 2,508,565, issued May 23, 1950.

In the system developed by Chance a pulse is transmitted by the radar system of an interrogating aircraft, a plurality of fixed radio frequency transmitters (hereinafter referred to as beacons) emits a series of pulses when the interrogation pulse is received. Each series of pulses from a particular beacon is uniquely coded to distinguish it from other beacons. The interval between the time the interrogation pulse is transmitted and the succeeding response from each beacon is received and is measured by the radar system of the interrogating aircraft and is proportional to the range of the aircraft from each respective beacon. The positions of the fixed beacons are known and therefore by measuring the range from the aircraft to at least two beacons the position of the interrogating aircraft may be established.

The aircraft may carry apparatus for automatically tracking in range a plurality of preselected beacons and giving a continuous indication of the aircraft position relative to the beacons. The effective range for such a system of blind navigation, using fixed station beacons, is limited to line-of-sight distances, in the order of 200 miles. Accordingly, it is an object of this invention to extend the effective range of such a beacon navigation system by making the beacons airborne.

It is a further object to provide said airborne beacons at temporary locations which may or may not be accessible from the ground or sea.

In making the beacons airborne, it is essential that movement of the aircraft be compensated for. Therefore, another object is to provide a virtual beacon whose range appears to be fixed for an interrogating aircraft over a preselected target.

Other objects, features and advantages of this invention will suggest themselves to those skilled in the art and will become apparent from the following description of the invention taken in connection with the accompanying drawings in which:

Fig. 1 is a geometric drawing of the problems involved in producing the virtual beacons; and Fig. 2 is a block diagram of a circuit embodying the principles of this invention.

The problems involved in providing a virtual beacon whose range is fixed from a preselected target are illustrated by a case shown in Fig. 1. In Fig. 1, location T designates a predetermined target to which an interrogating aircraft A is to be directed. A reference point P is established whose range from target T is known and will hereinafter be referred to as reference range $R_1$. The angle between the direction north and a line through target T and reference point P will be defined as $\theta_c$. A virtual beacon will be established along an arc FI whose center is coincident with target T.

An airborne beacon B, whose instantaneous position is a distance E to the east of and a distance N to the north of a reference point P, flies about reference point P, always remaining within arc FI. The distance from target T to beacon B will be designated as $R_2$. The extension of $R_2$ from beacon B in the direction of arc FI will intersect arc FI at virtual beacon V. The distance between beacon B and virtual beacon V will be defined as time delay distance D. As the aircraft flies about reference point P, the time delay distance D changes in accordance with the instantaneous position of the aircraft. Delay distance D is a measure of the amount of time delay which beacon B must impart to a reply to an interrogation pulse from an interrogating aircraft A at target T in order that the reply from beacon B will appear to have originated from the virtual beacon V.

The north-south, east-west rectangular coordinate axis of beacon B may be rotated clockwise through the angle $\theta_c$. By definition, then, coordinate Y will designate the position of beacon B relative to reference point P along an axis through target T and reference point P as represented by distance P. G. shown in Fig. 1. Coordinate X will designate the length of the normal B G from beacon B to coordinate Y.

According to well known trigonometric relations, the coordinates X and Y will be given by the equations:

$$X = E \cos \theta_c - N \sin \theta_c \quad (1)$$
$$Y = E \sin \theta_c + N \cos \theta_c \quad (2)$$

To fix the position of beacon B in terms of rectangular coordinates X and Y, the computer must solve Equations 1 and 2.

Arc FI is established a distance C from reference point P so that beacon B may be positioned at any azimuth with respect to reference point P and yet remain within the arc FI.

From the geometry of the drawings, it is apparent that:

$$(R_1+C) = (R_2+D) \quad (3)$$

The range delay D in each transmitted pulse from beacon B will be equal to:

$$D = R_1 + C - R_2 \quad (4)$$

The delay computer must solve Equation 4 in determining the time delay which beacon B must impart to a reply to an interrogation pulse from interrogating aircraft A.

In right triangle BGT:

$$R_2 = \sqrt{X^2 + (R_1-Y)^2} \quad (5)$$

Expanding Equation 5 by binomial expansion and dropping all but the first and second terms $$R_2 = R_1 - Y + X^2/2(R_1-Y) \quad (6)$$

Substituting Equation 6 into Equation 4 gives the delay, D, as:

$$D = C + Y - X^2/2(R_1-Y) \quad (7)$$

A delay computer which will solve Equation 7, namely $$D = C + Y - X^2/2(R_1-Y)$$

is shown in Fig. 2.

The terms S, $R_1$ and $\theta_c$ are predetermined constants for a particular target T and reference point P and this may be taken into account in a delay computer.

In this delay computer, the terms of Equation 7 representing the respective distances shown in Fig. 1 are converted into either equivalent voltages or equivalent shaft rotations. Equation 7 is then solved by mechanical-electrical means to derive a voltage whose amplitude is proportional to the time delay distance D.

Referring to Fig. 2, ground position indicator (GPI) computer 10 supplies to one end of primary winding 11 of coordinate resolver 14 an alternating voltage, the amplitude of which is proportional to the north-south coordinate N of the airborne beacon B with respect to reference point P. Similarly G. P. I. computer 10 supplies to one end of primary winding 13 of coordinate resolver 14 an alternating voltage, the amplitude of which is proportional to the east-west coordinate E of airborne beacon B with respect to reference point P. The other ends of primary windings 11 and 13 are grounded. A G. P. I. computer which may be used to supply the above described coordinate voltages has been disclosed in a copending patent application by John W. Gray and Duncan MacRae, Jr., Serial No. 598,162, entitled "Electrical Apparatus," filed June 7, 1945. More particularly, the computer 10 may be of the type disclosed in that portion of copending application Serial No. 598,162 which has reference to the Fig. 3 thereof. While the system as a whole shown in Fig. 3 may be used, that part which supplies information in respect to the ground range components as obtained from potentiometers 18 and 20 shown therein is sufficient for the present purpose. In further amplification of the above, it may be added that the input to the computer consists of two shaft rotations the rates of which are proportional respectively to the rectangular components of the ground velocity of the aircraft. These shaft rotations are utilized in the production of A. C. voltages proportional to the rectangular coordinates of a known fixed point with respect to the aircraft.

The fields of the primary windings 11 and 13 of coordinate resolver 14 are rigidly fixed at right angles to each other. The resolver 14 is of the type which acts as a coordinate transformer, transforming rectangular coordinates into polar coordinates. The field of the secondary winding 15 of coordinate resolver 14 is rigidly fixed at right angles to the field of the secondary winding 16. The secondary windings 15 and 16 may be rotated within the fields produced by the primary windings 11 and 13 by rotating azimuth knob 17. Azimuth knob 17 may consist of a dial upon which is inscribed the directions north, south, east, and west (N, S, E, and W).

One end of the secondary winding 15 is grounded. The amplitude of the alternating voltage output $E_y$ taken from terminal 18 is proportional to the coordinate Y, shown in Fig. 1. The Y coordinate voltage $E_y$ is applied to servo amplifier 20.

Servo amplifier 20 includes a differential amplifier 21 to which is applied the Y-coordinate voltage $E_y$. Differential amplifier 21 also receives a second alternating voltage input from the center tap of a potentiometer 23. Potentiometer 23 receives an alternating voltage from G. P. I. computer 10 which is synchronized with coordinate voltages.

The direct voltage output of differential amplifier 21 controls a motor 22. The motor is mechanically coupled through a shaft 29 to the center tap of the potentiometer 23 and through shaft 27 to differential gears 24. The differential amplifier 21 is a device commonly used in connection with servo-mechanisms which by fundamental definition comprises a branch point for two incoming functions and one outgoing function, wherein the outgoing function represents the difference of the two incoming functions. In accordance with standard servo-mechanism procedure, such difference or differential output is employed for the control of the correction device, such as a motor, in order to return the system to its null position. Motor 22 is of the type commonly used in such servo-mechanisms of the null type, the output of the differential amplifier serving to energize the motor. Further references to differential amplifiers and the motor associated therewith in this description are to be understood in the light of the above.

Differential gears 24 receive a second mechanical input through shaft 26 from handwheel 25. Differential gears 24 act to subtract the angular displacement of shaft 26 from the angular displacement of shaft 27. The output of differential gears 24, as represented by the angular displacement of a shaft, is multiplied by two in gear box 28.

The X-coordinate voltage $E_x$ appearing at terminal 30 of the secondary winding 16 of coordinate resolver 14 is applied to a driver stage 31. The output of this driver stage is then applied to a potentiometer 32.

The input impedance of driver stage 31 should be very high so that it will draw little current through secondary winding 16. A suitable driver circuit having a high input impedance is described in copending patent application by John W. Gray, Serial No. 580,021, entitled "Electrical Circuit," filed February 27, 1945, now Patent No.

2,594,912. The driver circuit disclosed therein comprises a voltage amplifier with the driver load and an un-bypassed resistor making up the cathode circuit. The plate of the voltage amplifier is connected to a cathode-coupled push-pull high-gain power amplifier, back into which a portion of the load voltage is fed in a regenerative manner, the output of which is the load itself. The driver circuit as a whole has degenerative feedback, due to the load being placed in the voltage amplifier cathode circuit.

Servo amplifier 40 includes differential amplifier 41 to which is applied the X-coordinate voltage, $E_x$. Differential amplifier 41 has a second alternating voltage input from the center tap of potentiometer 42. Potentiometer 42 is supplied with an alternating voltage, from G. P. I. computer 10, which is synchronized with the aforesaid coordinate voltages. The direct voltage output of differential amplifier 41 is applied to motor 43. Motor 43 is mechanically coupled to the center taps of potentiometer 32 through shaft 44 and of potentiometer 42 through shaft 45.

The alternating voltage output appearing at the center tap of potentiometer 32 is applied to a driver stage 50. Driver stage 50 may be similar to driver stage 31 with a different gain or voltage amplification. The output of driver stage 50 is applied through a variable resistor 51 in series with fixed resistors 52 and 53 to ground. The angular displacement of shaft 54 from gear box 28 acts to control the value of variable resistor 51.

The alternating voltage output appearing at the junction of resistors 52 and 53 is applied to a driver stage 54. The input impedance of driver stage 54 should be very high so that it will draw little current through resistors 51, 52, and 53 and not affect the range-voltage linearity characteristics of the resistor. Driver stage 54 may be similar to driver stage 50.

The output of driver stage 54 is applied to the primary winding of transformer 55. The gain of driver stage 54 and the windings of transformer 55 are such that a voltage $-E$ will appear at the secondary winding when a voltage $kE$ is applied to the driver stage.

An alternating voltage, derived from G. P. I. computer 10 and synchronized with the coordinate voltages, is applied to potentiometer 56. The output of potentiometer 56 taken from center tap 57 is applied to the primary winding of transformer 58.

The Y-component voltage, $E_y$, appearing at terminal 18 of the secondary winding 15 is applied through the secondary of transformer 58 and the secondary of transformer 55 to delay circuit 59. Delay circuit 59 may include a servo amplifier circuit similar to servo amplifier 20 and also a variable delay line.

An interrogation pulse will enter through antenna 60 to be detected and amplified in beacon receiver 61. The output of beacon receiver 61 is applied to the variable delay line in delay circuit 59. The angular displacement output of the servo amplifier in delay circuit 59 acts to control the amount by which the variable delay line delays an interrogation pulse.

Delay devices are well known to those skilled in the art. Such a device may consist of a liquid delay line including a crystal for producing a supersonic wave, a tubular conductor filled with liquid through which the wave travels, and a pickup device for producing a pulse when the supersonic wave reaches the end of the tube. The angular displacement output of the servo amplifier acts to control the relative position of the transmitting crystal with respect to the crystal pickup in the delay line. The time delay is a function of the distance between the pickup crystal and the transmitting crystal.

The delayed interrogation pulse, when applied to beacon transmitter 62, will cause a reply pulse to be generated and radiated from antenna 63.

The important application of this concept is to be found in an extension of the so-called Micro-H bombing and navigational system where fixed ground or ship beacon stations are utilized. The ranges of each beacon to the target are predetermined before the mission takes off. In the present case the beacons are made airborne whereby the flexibility of the system as a whole is increased as well as its precision. The line of sight is increased from approximately 250 to about 500 miles and the temporary erection of airborne beacons over enemy-held territory becomes possible. In a practical instance, the reference point shown at P in Fig. 1 could be a ship standing offshore and ranges upwards of 500 miles inland would be attainable.

The operation of this circuit will be explained with reference to Figs. 1 and 2. In Fig. 2 azimuth knob 17 is set to correspond to reference angle $\theta_c$. The secondary windings of coordinate resolver 14 are thereby oriented in the resultant field produced by the primary windings so that the amplitudes of the alternating voltages produced therein are proportional to the rotated coordinates of beacon B with respect to reference point P. Secondary winding 15 produces at terminal 18 an alternating voltage $E_y$, the amplitude of which is proportional to the coordinate Y shown in Fig. 1. Similarly, secondary winding 16 solves equation 1 and produces at terminal 30 an alternating voltage $E_x$, the amplitude of which is proportional to the coordinate X shown in Fig. 1.

Differential amplifier 21 receives the Y coordinate voltage $E_y$ and also an alternating voltage from the center tap of potentiometer 23. It produces in its output a direct voltage whenever there exists a voltage differential between the two inputs. The output of the differential amplifier 21 will therefore drive the motor 22 until the coordinate voltage is equalized by the voltage derived from potentiometer 23. The angular displacement of shaft 29 (also shaft 27) which is mechanically coupled to motor 22 is therefore proportional to the distance indicated as coordinate Y in Fig. 1.

Shaft 26 is rotated by means of handwheel 25 through an angular displacement which is proportional to the reference range shown as $R_1$ in Fig. 2.

Shafts 26 and 27 are mechanically coupled to differential gears 24 where the angular displacement of shaft 26 is effectively subtracted from that of shaft 27.

Gear box 28 produces an angular displacement in shaft 54 which is the differential gear output multiplied by two. The angular displacement of shaft 54 is therefore proportional to the factor $2(R_1-Y)$.

The coordinate voltage $E_x$ appearing at terminal 30 of the secondary winding 16 of coordinate resolver 14 is applied first to driver stage 31. The output of the driver stage is the coordinate voltage $E_x$ modified by a constant $k$. The alternating voltage $kE_x$ whose magnitude is proportional to the coordinate X shown in Fig. 1 will therefore appear across potentiometer 32.

The coordinate voltage $E_x$ is also applied to differential amplifier 41 of servo amplifier 40. Differential amplifier 41, potentiometer 42 and motor 43 are similar in action and construction to differential amplifier 21, potentiometer 23 and motor 22, respectively, of servo amplifier 20. The angular displacement of shaft 44 which is mechanically coupled to the center tap of potentiometer 32 and also to motor 43 is therefore proportional to the coordinate X in Fig. 1.

The center tap of potentiometer 32 furnishes an alternating voltage $E_1$ which is proportional to a constant $k_2$ times the square of the X-coordinate voltage, or $k_2 E_x^2$.

Driver stage 50 receives the voltage $E_1$ and produces in its output an alternating voltage the amplitude of which is proportional to a second constant $k_3$ times the square of the X-coordinate of voltage or $k_3 E_x^2$.

An alternating voltage proportional to $k_3 E_x^2$ is developed across variable resistor 51 and fixed resistors 52 and 53. The resistance of variable resistor 51 is proportional to the term $2(Y-R_1)$ as has been described. In the resistor combination the voltage $k_3 E_x^2$ is effectively divided by a voltage proportional to the term $2(Y-R_1)$. By proper choice of the resistances 52 and 53, the constant factor $k_3$ may be eliminated. Hence, the portion of the alternating voltage, appearing at the common connection of resistors 52 and 53, $E_2$, is proportional to the factor $X^2/2(R_1-Y)$.

Driver stage 54 receives in its input the voltage $E_2$ and produces at its output in the primary winding of transformer 55, a voltage which is proportional to a constant $k_3$ times $E_2$.

By the transformer action of transformer 55, the voltage $-E_2$ is induced in the secondary winding when a voltage $k_3 E_2$ is applied to the primary winding.

An alternating voltage, $E_c$, whose amplitude is proportional to the preselected distance C shown in Fig. 1, is derived from the center tap of potentiometer 57, and applied to the primary winding of transformer 58.

Therefore, to the Y coordinate voltage $E_y$, is vectorially added a constant voltage $E_c$ furnished by the transformer 58, and there is vectorially subtracted therefrom a voltage $E_2$ in transformer 55. The combined input to delay circuit 59 is therefore an alternating voltage $E_c + E_y - E_2$ the amplitude of which is proportional to the equation: $C+Y-X^2/2(R_1-Y)$. Referring to Equation 7, hereinabove, time delay distance D is given by the relation $C+Y-X^2/2(R_1-Y)$. Therefore the amplitude of the alternating voltage $E_c + E_y - E_2$ is proportional to the time delay distance D and will hereinafter be referred to as delay voltage $E_d$.

Delay circuit 59 receives the delay voltage $E_d$ and also an interrogation pulse from beacon receiver 61.

The servo amplifier will produce in its output a mechanical displacement proportional to the amplitude of the delay voltage $E_d$. It has been mentioned that the mechanical displacement of the servo amplifier output acts to control the amount by which the delay line delays an interrogation input pulse. The interrogation input pulse is therefore delayed in time by an interval equal to the time delay distance D shown in Fig. 1.

The delayed interrogation pulse will cause a pulse to be transmitted by beacon transmitter 62. The transmitted pulse will appear to an interrogating aircraft A at target T to have originated from virtual beacon V along arc FI.

A second airborne beacon transmitter similar to beacon B, but in a different location, will transmit range data in exactly the same manner as has been described in connection with beacon B.

At the target position T, the range data transmitted by the two beacons conforms with the accuracy of the G. P. I. computer, the beacon transmitter, beacon receiver, and the delay computer. However, for positions of the interrogating aircraft away from the target position there will be range errors, range rate errors, and heading errors. These errors will be a function of both the interrogating aircraft and beacon aircraft position, the angle between the two beacons, and the speed of the aircraft.

In an alternate method the beacon aircraft may fly about reference point P in a path where the coordinate X is substantially zero. In this simplified case only the coordinate Y and the constant delay distance C need be considered in determining the time delay distance D. From the G. P. I. computer may be derived a shaft output, the angular displacement of which is proportional to the coordinate Y. The shaft output from the G. P. I. computer and the constant delay distance C may be utilized directly in regulating the variable delay line.

This system of airborne beacons may be adapted to directing a ship or any other vehicle to or towards a particular spot.

The reference point P may be any convenient location. For instance, it may be a fixed position on the ground or a ship standing offshore.

While there has been described what is considered a preferred embodiment of this invention, it will be obvious to those skilled in the art that various changes and modifications may be made therein without departing from the scope of the invention.

What is claimed is:

1. In a navigation system utilizing a plurality of spaced beacons for determining the position of a first moving craft relative to a target, wherein at least one of said beacons is located on a second moving craft having a distance from the target which never exceeds a predetermined range therefrom; the combination on said second craft comprising receiving means for receiving interrogating pulses from said first craft, delay means coupled to said receiving means for delaying said received interrogating pulses for a time interval, computer means coupled to said delay means for rendering said time interval continuously proportional to the difference in distance of said predetermined range and the distance of said second aircraft from said target, and transmitter means coupled to said delay means for transmitting responding pulses in time coincidence with the delayed received interrogating pulses, whereby said second aircraft always appears to be at said predetermined range from said target.

2. The combination according to claim 1, wherein said computer means comprises means for solving the equation:

$$D = C + Y - \frac{x^2}{2(R_1 - Y)}$$

wherein $R_1$ is the distance from said target to a known fixed point, $R_1$ being less than said predetermined range; C is the distance from said fixed point to said predetermined range; D is the distance from said craft to said predetermined range; and X and Y are the rectangular coordinates of the instantaneous position of said second aircraft relative to said fixed point, the Y axis lying along $R_1$ and the X axis intersecting the Y axis at said fixed point.

3. The combination according to claim 2, wherein said means for solving the equation includes means for producing first and second voltages having magnitudes continuously proportional to X and Y, respectively, a first shaft, first servo amplifying means coupled to said first shaft, means for applying said second voltage to said first servo amplifying means to cause said first shaft to have an angular displacement proportional to said second voltage, differential gears connected to said first shaft, a second shaft connected to said differential gears, means for angularly displacing said second shaft by an amount proportional to $R_1$, a third shaft connected as an output to said differential gears having an angular displacement proportional to $(R_1-Y)$, a fourth shaft, a gear box interconnecting said third and fourth shafts for producing an angular displacement of said fourth shaft proportional to $2(R_1-Y)$, a first resistance, means for applying said first voltage across said resistance, a fifth shaft, second servo amplifying means coupled to said fifth shaft, means for applying said first voltage to said second servo amplifying means to cause said fifth shaft to have an angular displacement proportional to said first voltage, means coupled to said fifth shaft for tapping off a portion of the voltage across said first resistance to derive a third voltage proportional to $X^2$, second and third resistances connected in series, means for applying said third voltage across said serially connected second and third resistances, means coupling said fourth shaft to said second resistance to vary said second resistance in accordance with the angular displacement of said fourth shaft, whereby a fourth voltage proportional to $$\frac{X^2}{2(R_1-Y)}$$

is derived at the junction of said second and third resistances, means for producing a fifth voltage proportional to C, summing means, means for applying said second and fifth voltages to said summing means to obtain a sixth voltage proportional to $C+Y$, subtracting means, and means for applying said fourth and sixth voltages to said subtracting means to obtain a seventh voltage proportional to D.

4. The combination according to claim 3, wherein said delay means comprises a variable delay line, a third servo amplifying means coupled to said variable delay line, means for applying said seventh voltage to said third servo amplifying means to vary the length of said delay line to provide a delay proportional to D.

WILLIAM J. TULL.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,385,334 | Davey | Sept. 25, 1945 |
| 2,402,359 | Bedford | June 18, 1946 |
| 2,405,238 | Seeley | Aug. 6, 1946 |
| 2,405,239 | Seeley | Aug. 6, 1946 |
| 2,406,953 | Lewis | Sept. 3, 1946 |
| 2,420,408 | Behn | May 13, 1947 |
| 2,441,956 | Deloraine et al. | May 25, 1948 |